United States Patent [19]

Gans et al.

[11] Patent Number: 4,612,518

[45] Date of Patent: Sep. 16, 1986

[54] QPSK MODULATOR OR DEMODULATOR USING SUBHARMONIC PUMP CARRIER SIGNALS

[75] Inventors: Michael J. Gans, Monmouth Beach; Martin V. Schneider, Holmdel; Ralph F. Trambarulo, Red Bank, all of N.J.

[73] Assignee: AT&T Bell Laboratories, Murray Hill, N.J.

[21] Appl. No.: 738,441

[22] Filed: May 28, 1985

[51] Int. Cl.$^4$ ...................... H04L 27/20; H04L 27/22
[52] U.S. Cl. ........................................ 332/21; 329/50; 329/116; 329/122; 332/22; 332/23 R; 375/52; 375/67; 375/83; 375/94
[58] Field of Search .................... 332/9 R, 9 T, 16 R, 332/16 T, 21, 22, 23 R; 375/52, 55, 56, 67, 83, 84, 87, 94; 329/50, 122, 124, 116

[56] References Cited

U.S. PATENT DOCUMENTS

| | | | |
|---|---|---|---|
| 4,216,542 | 8/1980 | Frosch et al. | 375/67 |
| 4,276,521 | 6/1981 | Davidheiser | 332/23 R |
| 4,352,071 | 9/1982 | Childs et al. | 329/105 |
| 4,480,336 | 10/1984 | Wong et al. | 455/328 |
| 4,485,488 | 11/1984 | Houdart | 455/327 |
| 4,528,526 | 7/1985 | McBiles | 332/16 |

OTHER PUBLICATIONS

Schneider, IEEE Trans. MTT, vol. MTT-23, No. 3, Mar., 1975, pp. 271–275.

Giannini et al., IBM Tech. Disclosure Bulletin, vol. 21, No. 1, Jun. 1978, pp. 123–124.
Tatsuguchi et al., ICC '79, Jun. 10–14, 1979, Boston, Mass., vol. 2, pp. 26.2.1–26.2.5.
Shoho et al., Microwave Jrnl., vol. 25, No. 9, Sep. 1982, pp. 131–132, 134, 136, 138.
Dixon et al., IRMM 1983, Dec. 12–17, 1983, Miami Beach, Fla., paper T6.9.

*Primary Examiner*—Siegfried H. Grimm
*Attorney, Agent, or Firm*—Erwin W. Pfeifle

[57] ABSTRACT

The present invention relates to a QPSK modulator or demodulator for modulating two different input bit streams with a subharmonic pump carrier signal to produce an appropriately encoded QPSK output signal. The subharmonic pump carrier signal used is a submultiple of a predetermined microwave or millimeter-wave carrier frequency. The QPSK modulator or demodulator is capable of being fabricated on a planar substrate using appropriate stripline filters and a mixer diode in each of an in-phase and quadrature signal path. A fin line arrangement, also capable of fabrication on the substrate, can be used to introduce an appropriately phased subharmonic pump carrier signal into each of the in-phase and quadrature signal paths before each mixer diode. Each mixer diode mixes the associated data bit stream and one of the two appropriately phased pump carrier signals to produce separate output signals which modulate along separate orthogonal axes, which output signals are combined to produce the QPSK modulator output signal.

20 Claims, 5 Drawing Figures

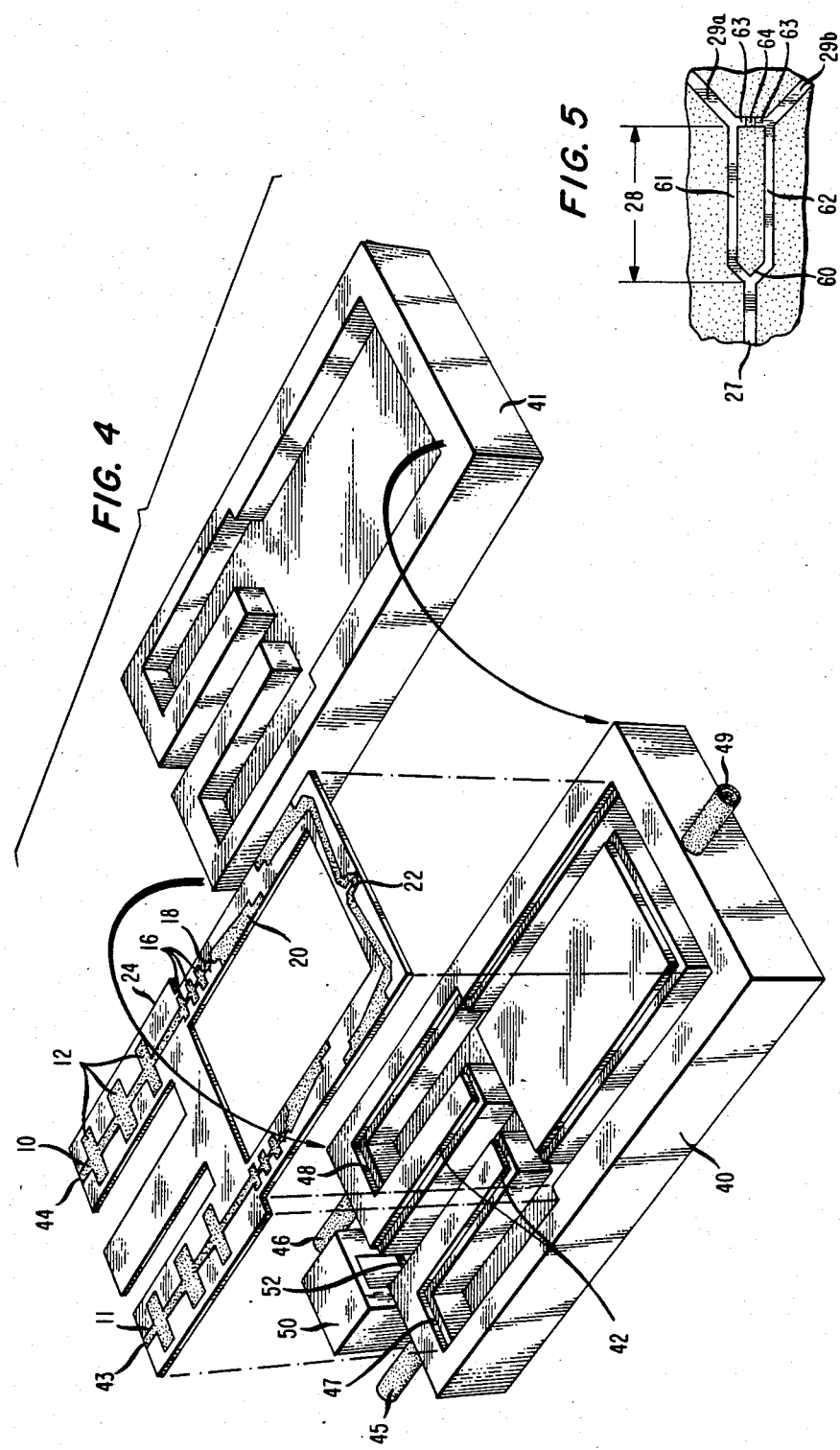

4,612,518

QPSK MODULATOR OR DEMODULATOR USING SUBHARMONIC PUMP CARRIER SIGNALS

The Government has rights in this invention pursuant to Contract No. F33657-84-C-3716.

TECHNICAL FIELD

The present invention relates to a QPSK modulator or demodulator and, more particularly, to a QPSK modulator or demodulator comprising mixer diodes fabricated on a single substrate, and an arrangement for introducing a subharmonic local oscillator signal into the mixer sections of the modulator or demodulator.

DESCRIPTION OF THE PRIOR ART

Many modulation techniques are known for use in transmitting information in communication systems. One of such modulation techniques is known as Quadrature Phase Shift Keying (QPSK). Various forms of QPSK modulators are known, one of which is disclosed in the article "Pulsed Offset QPSK Modulator" by R. J. Giannini et al in *IBM Technical Disclosure Bulletin*, Vol. 21, No. 1, June 1978 at pages 123-124. There, a single stream bit pattern is applied at an input to a combination demultiplexer and pulse expander including bit timing to produce predetermined waveforms in associated I and Q channels. More particularly, the QPSK modulator is operated with the control of the ON/OFF timing such that the I and Q channels are alternately gated off for 0.5T seconds with spacing of 2T seconds, or pulsed for 1.5T seconds with a spacing of 2T seconds.

Another form of a QPSK demodulator, or modulator, is disclosed in U.S. Pat. No. 4,352,071 issued to W. H. Childs et al. on Sept. 28, 1982. There, the demodulator includes an arrangement of couplers to permit the ports to be adjacent one another such that in mixer applications the circuitry need not leave the plane of the integrated circuit. A similar arrangement using couplers for a single input signal QPSK modulator is disclosed in FIG. 4 of the article by R. K. Shoho et al. in *Microwave Journal*, Vol. 25, No. 9, September, 1982, at pages 131-138.

As disclosed in U.S. Pat. No. 4,480,336 issued to J. S. Wong et al. on Oct. 30, 1984, it is known to make an orthogonal hybrid fin-line mixer which includes a two-piece housing with a fin-line mounted within the waveguide housing. There, one side of the substrate is disposed within the top half of the waveguide housing and the other half of the substrate is disposed within the bottom half of the waveguide housing. Such mixer arrangement, however, is not disclosed as concerning itself with QPSK modulation.

It is to be understood that the switching time of diodes in conventional path-length modulators has a significant impact on the data rate which a modulator can produce from an applied carrier. Such diodes necessarily operate on the minority carrier storage principle and, therefore, tend to be slow. For a data rate of 3 Gbit/sec, the bit interval is 0.3 ns, and 20% of the bit interval is equivalent to 60 picoseconds, which is the maximum tolerated rise time of the switching diode. Such short switching times are difficult to achieve with PIN diodes, dual-gate FETs and bipolar transistors (minority storage principle switches). Even bipolar transistors and dual-gate FETs, which operate on different principles, are still too slow. It should be further noted that PIN diodes used in path-length modulators have impedance characteristics which, as a function of bias voltage, cross from one point on the Smith chart to a corresponding point 180 degrees across the chart. During a fraction of this crossing time, the carrier is approximately matched to the switching diode. This high-loss resistive switching interval will result in "notching" of the carrier power during the transition which may last for several cycles of the pump. Additionally, with QPSK, the local oscillator used generally generates the same frequency as the frequency desired at the output. Therefore, mixing at millimeter waves requires a high frequency oscillator, which is very expensive, and the mixing process of the oscillator carrier frequency and the input signals provides more loss at the higher frequency. The problem, therefore, remaining in the prior art is to eliminate, as much as possible, the above-mentioned problems of rise time and notching and higher loss in the mixing process at the high frequencies.

SUMMARY OF THE INVENTION

The foregoing problem in the prior art has been solved in accordance with the present invention which relates to a QPSK modulator or demodulator comprising mixer diodes fabricated on a single substrate in quadrature signal paths with means for introducing a separate one of an in-phase and 90°/n subharmonic local oscillator pump carrier signal plus a separate first and second associated input signal data stream, respectively, to the mixer diodes in each of the respective quadrature signal paths of the modulator or demodulator.

It is an aspect of the present invention to provide a QPSK modulator or demodulator as described above wherein the mixer diode is switched from a conducting to a non-conducting state at some multiple of the pump cycle, as, for example, twice per pump cycle which corresponds to once per carrier cycle. This mode of diode operation allows the use of Schottky barrier diodes with vastly greater speed compared to the PINs, bipolar and FETs.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views:

FIG. 4 is a view in perspective of a fin-line mounting arrangement on the substrate of FIGS. 2 and 3; and FIG. 5 is an enlarged view of the fin-line divider arrangement in the substrate arrangement of FIG. 3.

DETAILED DESCRIPTION

The present invention relates to a high-speed QPSK modulator or demodulator for modulating a first and second appropriately phased subharmonic pump carrier frequency with first and second data streams, respectively, which data streams can be in the multigigabit range. The present QPSK modulator or demodulator is applicable for transmitting a sequence of pseudo-random pulses, comprising digitally encoded information, by means of a microwave or millimeter-wave carrier. It is to be understood that the present QPSK modulator or demodulator is applicable for use in satellite or terrestrial communication systems requiring the transmission of data at high bit rates. The advantages presented by the present QPSK modulator or demodulator arrangement are that (1) the modulator or demodulator is inherently broad-band, i.e., the circuit does not contain narrow-band couplers, shorting stubs or PIN switching diodes, (2) the QPSK modulator or demodulator is pumped with a local oscillator source at a submultiple of the microwave or millimeter-wave carrier frequency, and (3) the modulator or demodulator can readily be fabricated on a single substrate using conventional photolithographic pattern generation techniques.

Figure 1:
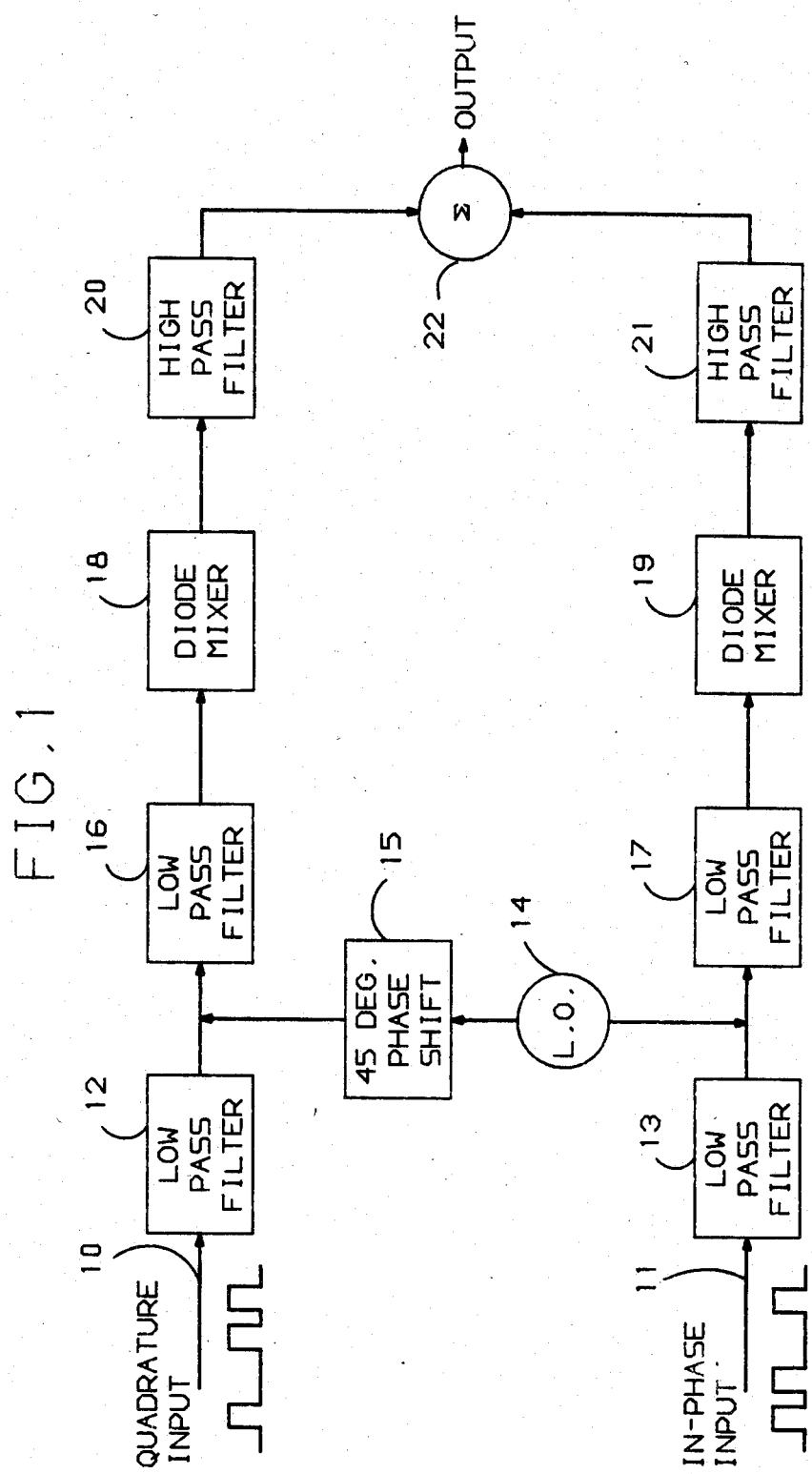
FIG. 1 is a block diagram of the QPSK modulator or demodulator in accordance with the present invention.

FIG. 1 is a block diagram of a QPSK modulator or demodulator in accordance with the present invention. The discussion which follows is primarily directed at the QPSK modulator. A first and second bit stream, comprising a separator first and second input signal, respectively, are received and propagated via a respective first and second rail 10 and 11 through the QPSK modulator. For purposes of description, the first signal on rail 10 will also be known as the quadrature signal and the second signal on rail 11 will also be known as the in-phase signal. It is to be understood that the first and second signal on rails 10 and 11, respectively, are received as separate input signals which are not in quadrature with one another, but that these input signals will be modulated into quadrature signals within the QPSK modulator prior to being transmitted from the output.

The first and second input signals, propagation on rails 10 and 11, pass through a first and a second low-pass filter 12 and 13, respectively. Low-pass filters 12 and 13 function to pass the input signal frequency but prevent a subharmonic pump carrier signal, introduced into rails 10 and 11 after filters 12 and 13, from reaching the input signal sources connected to the modulator. A local oscillator 14 generates a subharmonic pump carrier signal which carrier signal is a submultiple of a microwave or millimeter-wave carrier frequency. An in-phase subharmonic pump carrier signal from local oscillator 14 is introduced into rail 11 at the output of low-pass filter 13. The output signal from oscillator 14 is also sent through a 45 degree phase shifting means 15 to obtain a 45 degree subharmonic pump carrier signal which is introduced into rail 10 at the output of low-pass filter 12. The 45 degree subharmonic pump carrier signal produces a quadrature phase shift in the mixer output at twice the pump frequency. The combination of the first input signal and the 45 degree subharmonic pump carrier signal on rail 10 is sent through a third low-pass filter 16. Similarly, the combination of the second input signal and the in-phase subharmonic pump carrier signal on rail 11 is sent through a fourth low-pass filter 17. Low-pass filters 16 and 17 function to prevent the signals generated by diode mixers 18 and 19, on rails 10 and 11, respectively, from propagating back toward the associated input signal source but permit the associated digital bit stream input signal and the subharmonic pump carrier signal to pass therethrough.

Diode mixer 18 functions to mix the first digital data bit stream input signal with the 45 degree subharmonic pump carrier signal to produce a signal which is modulated along one axis between 90 and 270 degrees. Diode mixer 19 functions to mix the second digital data bit stream input signal with the in-phase subharmonic pump carrier signal to produce a signal which is modulated along a second axis between 0 and 180 degrees. Mixer diodes suitable for subharmonic mixing are GaAs or InP planar-doped barrier devices (PDB diodes), GaInAs structures, or two Schottky barrier diodes connected in anti-parallel as shown, for example, in the article "Harmonically Pumped Stripline Down-Converter" by M. V. Schneider et al. in *IEEE Transactions On Microwave Theory and Tecniques,* Vol. MTT-23, No. 2, March 1975, at pages 271-275. The output signals generated by diode mixers 18 and 19 are sent through high-pass filters 20 and 21, respectively, which function to pass the data bit stream modulated carrier signals at the desired frequency while preventing the lower frequency subharmonic pump carrier signals and baseband frequency bit streams from passing therethrough. The output signal from high-pass filter 20, modulating between 90 and 270 degrees, and the output signal from high-pass filter 21, modulating between 0 and 180 degrees, are combined in a combining means 22 to generate an output signal comprising a QPSK signal vectored at 45, 135, 235 or 315 degrees.

Figure 2:
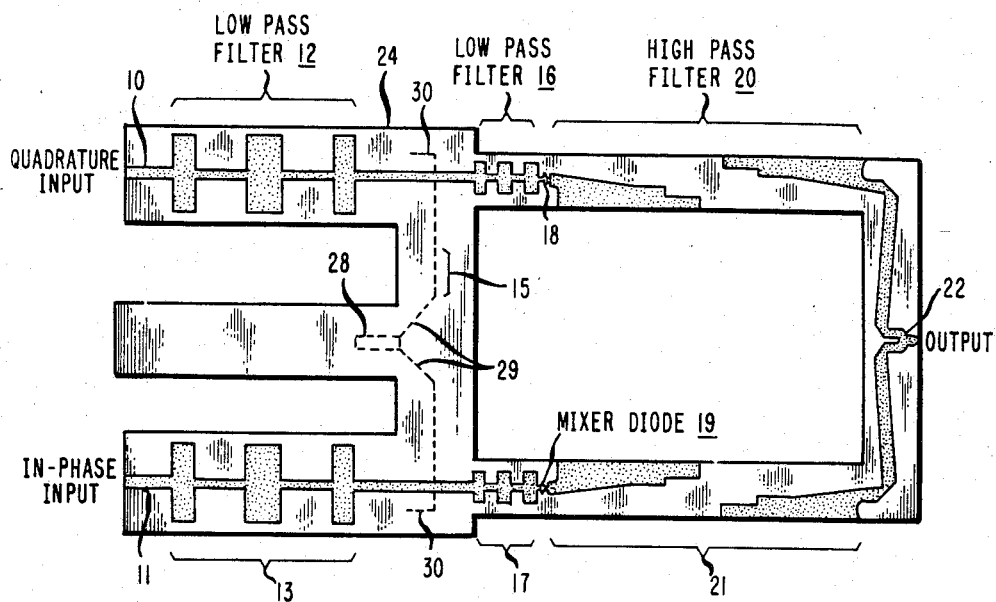
FIG. 2 is a view of a first side of a substrate including a conductive material pattern for implementing the QPSK modulator or demodulator arrangement of FIG. 1.
Figure 3:
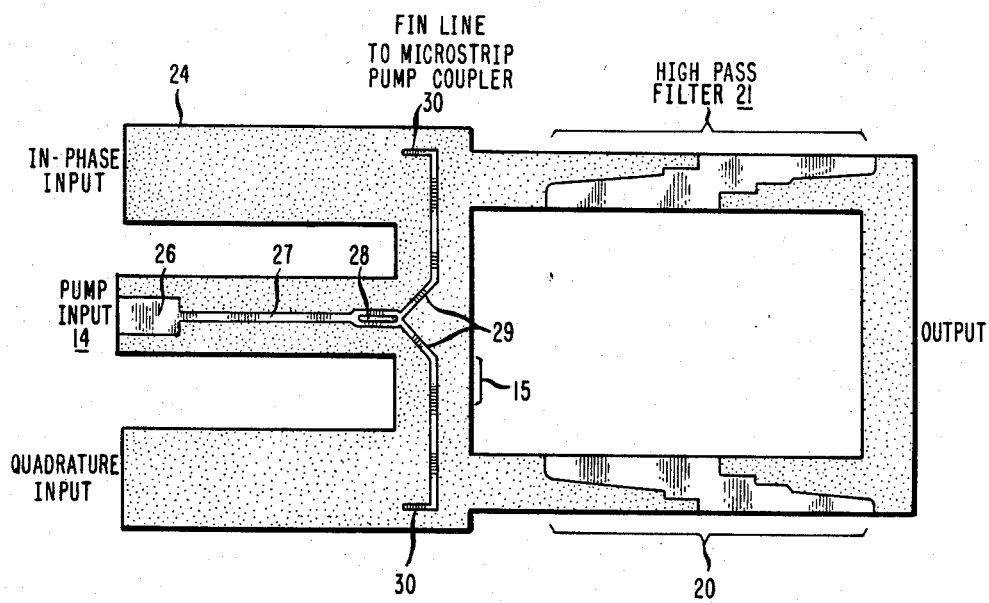
FIG. 3 is a view of a second side of the substrate of FIG. 2 including a conductive pattern for introducing a subharmonic local oscillator signal to the QPSK modulator or demodulator arrangement of FIG. 2.

FIGS. 2 and 3 illustrate a preferred arrangement for forming the QPSK modulator arrangement of FIG. 1 on a substrate 24 of dielectric material in accordance with the present invention. More particularly, FIG. 2 illustrates one major surface, e.g., a top surface, of dielectric substrate 24 including a first pattern of conductive material, shown in darkened form, disposed on the one major surface. FIG. 3 illustrates an opposing second major surface, e.g. a bottom surface, of the same substrate 24 of FIG. 2 including a second pattern of conductive material, shown in darkened form, disposed on the second major surface. The conductive material patterns on opposing sides of substrate 24 form the components of FIG. 1. It is to be understood that the conductive pattern on each side of the substrate 24 can be formed, for example, by well known photolithographic techniques. More particularly, a dielectric substrate 24 with a layer of conductive material on both opposing sides can be appropriately etched, by chemical or laser means, to remove the conductive material at specific areas and form the desired pattern.

In the arrangement of FIGS. 2 and 3, low-pass filters 12, 13, 16 and 17 are formed by (1) the alternating large and very narrow areas on the first side of substrate 24 as shown in FIG. 2, and (2) the layer of conductive material on corresponding areas of substrate 24 shown in FIG. 3 to form the appropriate L-C networks. High-pass filters 20 and 21 are formed by the spaced-apart reversed and mirrored step patterns on opposing edges of substrate 24. The outputs from high-pass filters 20 and 21 are combined in a combining means 22, which is achieved, as shown in FIG. 2, by merging the striplines from filters 20 and 21 at point 22. Mixers 18 and 19 can be formed using any suitable diode mixer as, for example, a planar doped barrier diode device which is well known in the art.

The local oscillator generated subharmonic pump carrier signal is introduced via a waveguide into the area 26 of removed conductive material as shown in FIG. 3. The subharmonic pump carrier signal propagates in a fin-line arrangement 27 to an area 28 where it is divided by a novel fin-line divider into two oppositely directed fin-lines 29. At the point where fin-lines 29, on the second side of substrate 24, pass under the striplines, on the first side of substrate 24, interconnecting low-pass filters 12 and 16 and low-pass filters 13 and 17, the associated pump subharmonic carrier signal will be introduced into the stripline interconnections between the associated low-pass filters. It is to be noted that the two opposingly directed fin-lines 29 have different lengths before they cross under the stripline interconnections between the low-pass filters. This difference in length between the fin-lines 29 forms phase shift means 15 and functions to introduce a 45 degree phase shift in the pump carrier signal propagating in the longer of fin-lines 29 before crossing under the associated stripline interconnection between low-pass filters 12 and 16. The ends 30 of fin-lines 29, after crossing under the stripline interconnections between low-pass filters 12–16 and 13–17, form shorts for the pumped subharmonic carrier wave.

FIG. 4 illustrates an exemplary arrangement for mounting the QPSK modulator arrangement of FIGS. 2 and 3. In FIG. 4, a lower half 40 and an upper half 41 of a waveguide housing, for mounting substrate 24 therein, comprise corresponding waveguide grooves which match the associated configuration of substrate 24. A recessed shelf 42 in the lower half 40 of the waveguide housing permits the appropriate positioning of substrate 24 in the waveguide housing. Once substrate 24 is positioned in lower half 40, the input terminals 43 and 44 on substrate 24 are electrically connected to, for example, coaxial cable connectors 45 and 46, respectively, via respective holes 47 and 48 in lower half 40 of the waveguide housing. Similarly, the output of combining means 22 of the QPSK modulator is electrically connected to, for example, a coaxial waveguide connector 49. A waveguide output pump oscillator 50, as, for example, a Varian model VSK-9004 Gunn oscillator, is shown mounted on lower half 40 for introducing the subharmonic pump carrier signal from local oscillator 14 to the lower section of the center leg of substrate 24. It is to be understood that any other suitable arrangement for introducing the subharmonic pump carrier signal can be used. A step is shown in lower half 40 at the output of pump oscillator 50 to provide appropriate matching between waveguides. Once substrate 24 is positioned on shelf 42 in lower half 40 and connected to the appropriate input and output connectors, the top half 41 of the waveguide housing is positioned on the bottom half 40 and secured together for subsequent mounting in a transmitter or receiver.

FIG. 5 illustrates a novel fin-line divider 28 forming part of the fin-line arrangement for introducing the subharmonic pump carrier signal to rails 10 and 11. It is to be understood that such fin-line divider can be used for dividing any kind of signal propagating in a fin-line arrangement. In FIG. 5, the subharmonic pump carrier signal arriving in fin-line 27 arrives at point 60 and divides equally into each of fin-lines 61 and 62 via the angled separation. Paths 61 and 62 are extended into paths 29a and 29b, respectively, which are angled outwards to continue on the fin-lines 29 shown in FIG. 3. Each of the angled separations between fin-lines 61–62 and 29a–29b form gradual separations to prevent mode changes and to provide appropriate cancellation of waves propagating in the fin-lines 29a–29b and 61–62 back towards fin-line 27. A thin resistive fin-line 63 which can include a chip resistor 64, is disposed between the intersection of fin-lines 61 and 62 with fin-lines 29a and 29b, respectively. Therefore, waves propagating back along fin-lines 29a and 29b will be directed into resistive fin-line 63 and, if properly oriented with one another, will be canceled. Remaining waves propagating back along fin-lines 61 and 62, if properly oriented when arriving at point 60 will also be shorted and canceled.

It is to be understood that the abovedescribed embodiments are simply illustrative of the principles of the invention. Various other modifications and changes may be made by those skilled in the art which will embody the principles of the invention and fall within the spirit and scope thereof. For example, the arrangements of FIGS. 2 and 3 could be modified to use other configurations or elements for the filters, the mixer, the combining means, and the means for introducing the subharmonic pump carrier signal to the mixer. Additionally, the waveguide housing of FIG. 4 could be replaced or modified with some other similar suitable arrangement. It is to be understood that the description hereinbefore for the QPSK modulator can also be used for an embodiment of a QPSK demodulator at a receiver, where the modulated carrier from a remote transmitter is received at combining means 22 and the subharmonic pump signal from local oscillator 14 is synchronized with the modulated carrier.

What is claimed is:

1. A Quadrature Phase Shift Keying (QPSK) modulator comprising:
   a first and a second input terminal for receiving a first and a second digital signal, respectively, for propagation along a respective first and second rail;
   means for coupling an in-phase and a 90°/n subharmonic pump carrier signal into the first and second rail, respectively, the pump carrier signal comprising a frequency which is a submultiple (1/n) of a predetermined microwave or millimeter-wave carrier frequency, where n is an integer greater than 1;
   a first mixer disposed in the first rail for modulating the first digital signal and the in-phase subharmonic pump carrier signal to generate an output signal modulating along a first axis;
   a second mixer disposed in the second rail for modulating the second digital signal with the 90°/n subharmonic pump carrier signal to generate an output signal modulating along a second axis which is orthogonal to the first axis; and
   means for combining the output signals from the first and second mixers to generate a QPSK output signal.

2. A QPSK modulator according to claim 1 wherein the first and second input terminals, the first and second rails, the subharmonic pump carrier coupling means, the first and second mixer and the combining means are formed on a dielectric substrate.

3. A QPSK modulator according to claim 2 wherein the first and second input terminal, the first and second rails, the first and second mixer and the combining means are formed on a first major surface of the dielectric substrate, while the in-phase and 90°/n subharmonic pump carrier coupling means is formed on a second major surface of the dielectric substrate.

4. A QPSK modulator according to claim 3 wherein the means for coupling an inphase and a 90°/n subharmonic pump carrier signal into the first and second rails comprises:
   a fin-line structure capable of receiving a subharmonic pump carrier signal, the fin-line structure comprising;

means (28) for dividing a received pump carrier wave signal into a first and second component thereof, and a first and a second wave path (29) coupled to the output of the dividing means for propagating the first and second components of the subharmonic pump carrier signal adjacent to the first and second rails, respectively, for coupling the associated subharmonic pump carrier signal component into the associated rail, said second wave path comprising a length which is longer than the first wave path to cause the first and second subharmonic pump carrier signal components to differ in-phase by 90°/n, respectively, when propagating adjacent the respective, first and second rails.

5. A QPSK modulator according to claim 4 wherein the dividing means (28) of the fin-line structure comprises:

first section (60) capable of receiving a subharmonic pump carrier signal and directing a first and second component thereof along a first and second waveguide which diverge from a common point at an acute angle;

a second section wherein the first and second waveguides (61, 62) are continued from the first section substantially parallel to each other and coupled to the first and second wave paths, and a resistive wave path (63) interconnecting the first and second waveguides at a second end thereof, the first and second waveguides of the second section coupling the subharmonic pump carrier signal components to the first and second wave paths (29) of the fin-line structure which diverge at an acute angle away from the second end of the second section.

6. A QPSK modulator according to claim 1, 2, 3, 4, or 5, the QPSK modulator further comprising:

first and second low-pass filtering means disposed in each of the first and second rails before the first or second mixer and on either side of the point where the first and second subharmonic pump carrier signals are coupled into the first and second rails, respectively, the first low-pass filtering means being arranged to pass the associated digital input signal while blocking the passage of the associated subharmonic pump carrier signal to the associated first or second input terminal, and the second low-pass filtering means being arranged to block the output signal from the associated mixer from propagating back towards the associated input terminal.

7. A QPSK modulator according to claim 1, 2, 3, 4, or 5 wherein the first and second mixer comprise a first and second diode mixer, respectively.

8. A QPSK modulator according to claim 6 wherein the first and second mixer comprise a first and second diode mixer, respectively.

9. A QPSK modulator according to claims 1, 2, 3, 4 or 5 wherein the modulator further comprises:

a high-pass filtering means disposed in each of the first and second rails after the associated mixer, the high-pass filtering means being capable of passing the output signal from the mixer while preventing the associated subharmonic pump carrier frequency from passing therethrough to the combining means.

10. A QPSK modulator according to claim 6 wherein the modulator further comprises:

a high-pass filtering means disposed in each of the first and second rails after the associated mixer, the high-pass filtering means being arranged to pass the output signal from the associated mixer while preventing the associated subharmonic pump carrier frequency from passing therethrough to the combining means.

11. A Quadrature Phase Shift Keying (QPSK) demodulator comprising:

an input terminal for receiving a QPSK input signal comprising a first and a second digital signal modulated along a first and a second orthogonal axis, respectively, with a predetermined microwave or millimeter-wave carrier signal;

a first and second output terminal;

means for dividing the QPSK input signal along a first and a second portion thereof for propagation along a first and a second rail, respectively;

means for coupling an in-phase and a 90°/n subharmonic pump carrier into the first and second rail, respectively, the pump carrier signal comprising a frequency which is a submultiple 1/n of the predetermined microwave or millimeter-wave carrier signal and is synchronized thereto, where n is an integer greater than 1;

a first mixer disposed in the first rail for modulating the first portion of the QPSK input signal and the in-phase subharmonic pump carrier signal to generate a first output signal comprising only the first digital signal received in the QPSK input signal for transmission to the first output terminal; and a second mixer disposed in the second rail for modulating the second portion of the QPSK input signal and the 90°/n subharmonic pump carrier signal to generate a second output signal comprising only the second digital signal received in the QPSK input signal for transmission to the second output terminal.

12. A QPSK demodulator according to claim 11 wherein the input terminal, the first and second output terminals, the first and second rails, the subharmonic pump carrier coupling means, the first and second mixer and the dividing means are formed on a dielectric substrate.

13. A QPSK demodulator according to claim 12 wherein the first and second output terminal, the first and second rails, the first and second mixer and the dividing means are formed on a first major surface of the dielectric substrate, while the in-phase and 90°/n subharmonic pump carrier coupling means is formed on a second major surface of the dielectric substrate.

14. A QPSK demodulator according to claim 13 wherein the means for coupling an in-phase and a 90°/n subharmonic pump carrier signal into the first and second rails comprises:

a fin-line structure capable of receiving a subharmonic pump carrier signal, the fin-line structure comprising;

means for dividing a received pump carrier wave signal into a first and second component thereof, and a first and a second wave path coupled to the output of the dividing means of the fin-line structure for propagating the first and second components of the subharmonic pump carrier signal adjacent to the first and second rails, respectively, for coupling the associated subharmonic pump carrier signal component into the associated rail, said second wave path comprising a length which is longer than the first wave path to cause the first and second subharmonic pump carrier signal components to differ in phase by 90°/n, respectively, when propagating adjacent to the respective first and second rails.

15. A QPSK demodulator according to claim 14 wherein the dividing means of the fin-line structure comprises:

a first section capable of receiving a subharmonic pump carrier signal and directing a first and a second component thereof along a first and a second waveguide which diverge from a common point at an acute angle;

a second section wherein the first and second waveguides are continued from the first section substantially parallel to each other and coupled to the first and second wave paths, and a resistive wave path interconnecting the first and second waveguides at a second end thereof, the first and second waveguides of the second section coupling the subharmonic pump carrier signal components to the first and second wave paths of the fin-line structure which diverge at an acute angle away from the second end of the second section.

16. A QPSK demodulator according to claim 11, 12, 13, 14, or 15 the QPSK demodulator further comprising:

first and second low-pass filtering means disposed in each of the first and second rails after the first and second mixer and on either side of the point where the first and second subharmonic pump carrier signals are coupled into the first and second rails, respectively, the first low-pass filtering means in each rail being arranged to pass the associated demodulated digital signal from the first mixer while blocking the passage of the associated subharmonic pump carrier signal to the associated output terminal, and the second low-pass filtering means is arranged to block the portion of the received QPSK signal operating at the output of associated mixer from propagating towards the associated output terminal while passing (a) the associated subharmonic pump carrier signal and (b) the demodulated digital signal from the associated mixer.

17. A QPSK demodulator according to claim 11, 12, 13, 14, or 15 wherein the first and second mixer comprise a first and second diode mixer, respectively.

18. A QPSK demodulator according to claim 16 wherein the first and second mixer comprise a first and a second diode mixer, respectively.

19. A QPSK demodulator according to claim 11, 12, 13, 14 or 15 wherein the demodulator further comprises:

a first and second high-pass filtering means disposed in the first and second rails, respectively, before the respective first and second mixer, the high-pass filtering means being capable of passing the associated portion of the input signal from the dividing means to the mixer while preventing the associated subharmonic pump carrier frequency from passing therethrough to the dividing means.

20. A QPSK demodulator according to claim 16, wherein the demodulator further comprises:

a first and a second high-pass filtering means disposed in the first and second rails, respectively, before the respective first and second mixer, the high-pass filtering means being capable of passing the associated portion of the input signal from the dividing means to the mixer while preventing the associated subharmonic pump carrier frequency from passing therethrough to the dividing means.

* * * * *

UNITED STATES PATENT AND TRADEMARK OFFICE
CERTIFICATE OF CORRECTION

PATENT NO. : 4,612,518

DATED : September 16, 1986

INVENTOR(S) : Michael J. Gans, Martin V. Schneider, Ralph F. Trambarulo

It is certified that error appears in the above-identified patent and that said Letters Patent is hereby corrected as shown below:

Column 8, line 16, "along" should read --into--.

Column 10, line 2, "operating" should read --appearing--.

Signed and Sealed this

Seventh Day of April, 1987

Attest:

DONALD J. QUIGG

*Attesting Officer*    *Commissioner of Patents and Trademarks*